(No Model.)
G. E. MEEKER.
BLACKING BRUSH.
No. 303,306. Patented Aug. 12, 1884.
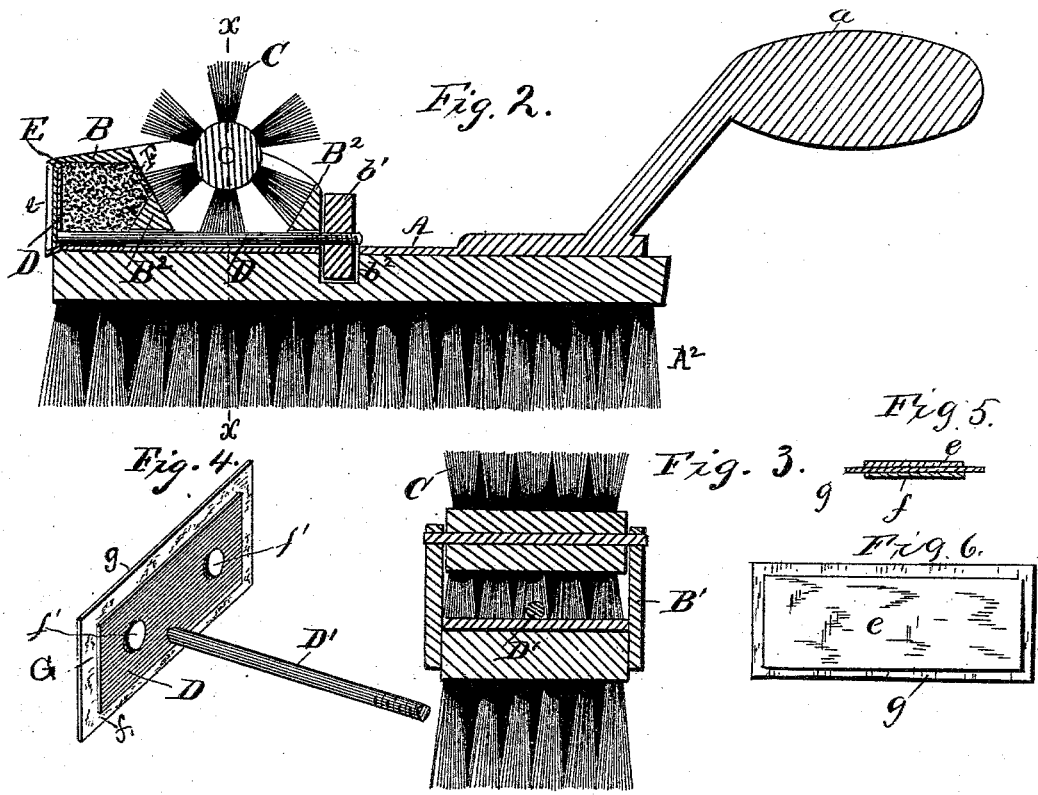

United States Patent Office.

GEORGE E. MEEKER, OF MERIDEN, CONNECTICUT, ASSIGNOR OF TWO-THIRDS TO JUNIUS S. NORTON, JR., AND FRANK WHEELER, BOTH OF SAME PLACE.

BLACKING-BRUSH.

SPECIFICATION forming part of Letters Patent No. 303,306, dated August 12, 1884.

Application filed November 8, 1883. (No model.)

*To all whom it may concern:*

Be it known that I, GEORGE E. MEEKER, a citizen of the United States of America, residing at Meriden, in the county of New Haven and State of Connecticut, have invented certain new and useful Improvements in Blacking and Stove Brushes, of which the following is a specification, reference being had therein to the accompanying drawings.

My invention pertains to improvements in blacking and stove brushes; and it consists in the peculiar construction, combination, and arrangement of the parts, substantially as hereinafter more fully shown and described.

In the drawings, Figure 1 is a side elevation. Fig. 2 is a sectional elevation. Fig. 3 is a cross-section on the line $x\ x$. Fig. 4 is a detail view. Fig. 5 is a sectional view of the rake; and Fig. 6 is a back view thereof.

In constructing my blacking and stove brush, I rigidly secure to an ordinary blacking-brush the plate A, having on each longitudinal side thereof a flange, A', provided with apertures for screwing it to the back of the brush, as shown. The metallic plate A thus secured to the brush, has cast integral therewith a handle, $a$, which may be made hollow, the blacking-chamber B having the walls B' and the fender B², and in front of blacking-chamber B is provided an opening for insertion of blacking which is stored therein, the blacking being directed to the brush by means of fender B², which also serves to prevent too great quantity thereof being supplied to the revolving brushes and its consequent waste.

The revolving brush C comprises a series of brushes arranged a short distance apart in parallel lines, and radiating from a common central shank, through which projects a longitudinal journal having its bearings in the walls B', and is thus constructed to prevent taking up a wasteful quantity of blacking.

The supply of blacking or polishing material furnished to the revolving brush C is adjusted by means of the rake G, Fig. 4, which being rigidly secured to the screw-rod D', having the nut $b'$ located in the guide-slot $b^2$ in plate A, is by rotation of the nut $b'$ caused to move inward through the opening E of the chamber, carrying with it the blacking or polish, which is thus carried forward to the mouth of the fender-opening F and into immediate contact with the revolving brush C.

The metallic plates $e$ and $f$ forming the shovel end of the rake G are made slightly smaller than the opening E of the blacking-chamber, and secured between these corresponding plates, $e$ and $f$, of which the shovel of the rake is partly composed, is an elastic sheet of packing, $g$, which, projecting slightly beyond the rectangular frame of the rake, in practice seals the opening E and prevents any escape of the material outwardly therefrom, and thus enables the blacking packed in its chamber to be safely conveyed with the brush from point to point without danger of waste or escape of the blacking. The plates $e$ and $f$ are riveted together by rivets $f'$.

I am aware that it is not broadly new in blacking-brushes to combine in one and the same device the brush and the chamber for holding the blacking, as shown in the patent of F. M. Carnes, No. 59,709, of November 13, 1866, which I disclaim.

What I claim, and desire to secure by Letters Patent, is—

1. In a blacking and stove brush, the combination of the rake G, actuated by nut $b'$, blacking-chamber B, having fender B², and brush C, substantially as shown, and for the purpose described.

2. In a blacking and stove brush, the combination of the blacking-brush A², plate A, having handle $a$, blacking-chamber B, having walls B', and fender B², brush C, rake G, having plates $e$ and $f$, and packing $g$, and nut $b'$, secured in guide-slot $b^2$, substantially as shown and described.

In testimony whereof I affix my signature in presence of two witnesses.

GEORGE E. MEEKER.

Witnesses:
N. G. WARRICK,
A. L. OTIS.